United States Patent
Le Roy et al.

(10) Patent No.: US 7,169,453 B2
(45) Date of Patent: Jan. 30, 2007

(54) MULTILAYER STRUCTURE AND TANK CONSISTING OF THIS STRUCTURE, WHICH HAS A BARRIER LAYER IN DIRECT CONTACT WITH THE FLUID CONTAINED

(75) Inventors: Christophe Le Roy, Evreux (FR); Joachim Merziger, Evreux (FR); Jerome Pascal, Saint Cyr de Salerne (FR)

(73) Assignee: Arkema France, Paris LaDefense Cedex (FR)

( * ) Notice: Subject to any disclaimer, the term of this patent is extended or adjusted under 35 U.S.C. 154(b) by 618 days.

(21) Appl. No.: 09/777,012

(22) Filed: Feb. 6, 2001

(65) Prior Publication Data

US 2002/0051891 A1    May 2, 2002

(30) Foreign Application Priority Data

Feb. 7, 2000    (EP)   .................................. 00400327

(51) Int. Cl.
*B32B 27/00*    (2006.01)

(52) U.S. Cl. .................. 428/36.7; 428/34.1; 428/35.4; 428/35.7; 428/35.9; 428/36.5; 428/36.91; 428/515

(58) Field of Classification Search ............... 428/35.7, 428/36.5, 35.4, 35.9, 34.1, 36.91, 515, 36.7
See application file for complete search history.

(56) References Cited

U.S. PATENT DOCUMENTS

| | | | | |
|---|---|---|---|---|
| 4,115,475 A | * | 9/1978 | Foy et al. | 525/425 |
| 4,195,015 A | * | 3/1980 | Deleens et al. | 524/255 |
| 4,230,838 A | * | 10/1980 | Foy et al. | 525/408 |
| 4,331,786 A | * | 5/1982 | Foy et al. | 525/408 |
| 4,332,920 A | * | 6/1982 | Foy et al. | 525/408 |
| 4,684,576 A | | 8/1987 | Tabor | 428/441 |
| 4,839,441 A | * | 6/1989 | Cuzin et al. | 528/328 |
| 4,864,014 A | * | 9/1989 | Cuzin et al. | 528/279 |
| 5,114,765 A | | 5/1992 | Inada | 428/357 |
| 5,516,583 A | * | 5/1996 | Zhang et al. | 428/355 |
| 5,643,997 A | | 7/1997 | Matsuoka | 525/71 |
| 5,705,565 A | * | 1/1998 | Hughes et al. | |
| 5,998,545 A | * | 12/1999 | Melot et al. | 525/178 |

FOREIGN PATENT DOCUMENTS

| | | | |
|---|---|---|---|
| EP | 647681 | * | 4/1995 |
| EP | 0731308 | | 9/1996 |
| EP | 731308 | * | 9/1996 |
| EP | 742236 | * | 11/1996 |
| FR | 2291225 | * | 11/1975 |
| GB | 2288177 | * | 10/1995 |
| WO | 98/55297 | | 12/1998 |

* cited by examiner

*Primary Examiner*—Marc A. Patterson

(57) ABSTRACT

Described are structures comprising, successively: a first layer of high density polyethylene (HDPE), a layer of binder, a second layer of EVOH or of a mixture based on EVOH, optionally a third layer of polyamide (A) or of a mixture of polyamide (A) and polyolefin (B). Also described are devices for transferring or storing fluids and more particularly tubes, tanks, chutes, bottles and containers consisting of the above structure and in which the barrier layer (the second or the combination of the second and the third layer) is in direct contact with the fluid contained or transported.

26 Claims, No Drawings

MULTILAYER STRUCTURE AND TANK CONSISTING OF THIS STRUCTURE, WHICH HAS A BARRIER LAYER IN DIRECT CONTACT WITH THE FLUID CONTAINED

FIELD OF THE INVENTION

The present invention relates to a multilayer structure and to a tank consisting of this structure, which has a barrier layer in direct contact with the fluid contained. The barrier layer of the structures of the invention constitutes one of the faces of the structure, i.e. it is not inside the structure. These structures are useful for making devices for transferring or storing fluids and more particularly tubes, tanks, tank chutes, i.e. the tube which serves to fill the reservoir, bottles and containers in which the barrier layer is in contact with the fluid.

The invention is useful for a fluid such as motor vehicle petrol, by avoiding losses through the structure so as not to pollute the environment. It is also useful for liquids containing volatile substances, by avoiding a depletion of this volatile substance from the liquid. The invention is useful also for fluid of the motor cooling system, for oil and for the fluid of the air conditionning. The structures of the invention are of the type: HDPE/binder/barrier layer in which "HDPE" denotes high density polyethylene.

BACKGROUND OF THE INVENTION

Patent EP 742 236 describes petrol tanks consisting of five layers which are, respectively:
high density polyethylene (HDPE);
a binder;
a polyamide (PA) or a copolymer containing ethylene units and vinyl alcohol units (EVOH);
a binder;
HDPE.

A sixth layer can be added between one of the layers of binder and one of the HDPE layers. This sixth layer consists of manufacturing scraps following moulding of the tanks, and to a much smaller extent of non-compliant tanks. These scraps and non-compliant tanks are then ground until granules are obtained. This ground material is then remelted and extruded directly at the tank coextrusion plant. This ground material may also be melted and regranulated by means of an extruding machine such as a twin-screw extruder, before being reused.

According to one variant, the recycled product can be mixed with the HDPE from the two extreme layers of the tank. It is possible, for example, to mix the granules of recycled product with granules of virgin HDPE of these two layers. It is also possible to use any combination of these two recyclings. The content of recycled material can represent up to 50% of the total weight of the tank.

Patent EP 731 308 describes a tube comprising an inner layer comprising a mixture of polyamide and of polyolefin with a polyamide matrix and an outer layer comprising a polyamide. These tubes based on polyamide are useful for transporting petrol and more particularly for bringing the petrol from the motor vehicle tank to the motor and also, but in larger diameter, for transporting hydrocarbons in service stations between the distribution pumps and the underground storage tanks.

According to another form of the invention, a layer of a polymer comprising ethylene units and vinyl alcohol units (EVOH) can be placed between the inner and outer layers. The structure: inner layer/EVOH/binder/outer layer is advantageously used.

SUMMARY OF THE INVENTION

The tanks described in EP 742 236 and which do not have the barrier layer in direct contact with the petrol do admittedly have barrier properties, but they are not sufficient when very low petrol losses are desired. EP 731 308 describes tubes whose outer layer is made of polyamide and the barrier layer in direct contact with the petrol, the layer made of polyamide is necessary for the mechanical strength of the assembly. Novel structures have now been found which have better barrier properties and which are useful for various objects such as, for example, petrol tanks for motor vehicles.

Upon further study of the specification and appended claims, further objects and advantages of this invention will become apparent to those skilled in the art.

The present invention relates to a structure comprising, successively:
a first layer of high density polyethylene (HDPE),
a layer of binder,
a second layer of EVOH or of a mixture based on EVOH,
optionally a third layer of polyamide (A) or of a mixture of polyamide (A) and polyolefin (B).

In the text hereinbelow, the second layer or the combination of the second and the third layer is referred to as the "barrier layer".

The present invention also relates to devices for transferring or storing fluids and more particularly tubes, tanks, chutes, bottles and containers consisting of the above structure and in which the barrier layer is in direct contact with the fluid contained or transported. These devices can be manufactured by the usual techniques of the thermoplastic polymer industry, such as coextrusion or extrusion-blow moulding.

As regards the first layer, the high density polyethylene (HDPE) is described in Kirk-Othmer, 4th Edition, Vol. 17, pages 704 and 724–725. It is, according to ASTM D 1248-84, an ethylene polymer with a density at least equal to 0.940. The name HDPE relates both to ethylene homopolymers and its copolymers with small proportions of olefin. The density is advantageously between 0.940 and 0.965. In the present invention, the MFI of the HDPE is advantageously between 0.1 and 50. By way of example, mention may be made of Eltex B 2008® with a density of 0.958 and an MFI of 0.9 (in g/10 min at 190° C. under 2.16 kg), Finathene® MS201B from FINA and Lupolen®4261 AQ from BASF.

As regards the second layer, the EVOH copolymer is also referred to as a saponified ethylene-vinyl acetate copolymer. The saponified ethylene-vinyl acetate copolymer to be used according to the present invention is a copolymer with an ethylene content of from 20 to 70 mol %, preferably from 25 to 70 mol %, the degree of saponification of its vinyl acetate component not being less than 95 mol %. With an ethylene content of less than 20 mol %, the barrier properties under conditions of high humidity are not as high as would be desired, whereas an ethylene content exceeding 70 mol % leads to reductions in barrier properties. When the degree of saponification or of hydrolysis is less than 95 mol %, the barrier properties are sacrificed.

The expression "barrier properties" means the impermeability to gases, to liquids and in particular to oxygen, and to petrol for motor vehicles. The invention relates more particularly to the barrier to petrol for motor vehicles.

Among these saponified copolymers, those which have melt flow indices, under hot conditions, in the range from 0.5 to 100 g/10 minutes are particularly useful. Advantageously, the MFI is chosen between 5 and 30 (g/10 min at 230° C. under 2.16 kg), "MFI", the abbreviation for "melt flow index" denoting the flow rate in the molten state.

It is understood that this saponified copolymer can contain small proportions of other comonomer ingredients, including α-olefins such as propylene, isobutene, α-octene, α-dodecene, α-octadecene, etc., unsaturated carboxylic acids or salts thereof, partial alkyl esters, whole alkyl esters, nitrites, amides and anhydrides of the said acids, and unsaturated sulphonic acids or salts thereof.

As regards the mixtures based on EVOH, they are such that the EVOH forms the matrix, i.e. it represents at least 40% by weight of the mixture and preferably at least 50%. The other constituents of the mixture are chosen from polyolefins, polyamides and optionally functional polymers.

As a first example of these mixtures based on EVOH of the second layer, mention may be made of the compositions comprising (by weight):

55 to 99.5 parts of EVOH copolymer, 0.5 to 45 parts of polypropylene and of compatibilizer, the proportions thereof being such that the ratio of the amount of polypropylene to the amount of compatibilizer is between 1 and 5.

Advantageously, the ratio of the MFI of the EVOH to the MFI of the polypropylene is greater than 5 and preferably between 5 and 25. Advantageously, the MFI of the polypropylene is between 0.5 and 3 (in g/10 min at 230° C. under 2.16 kg). According to one advantageous form, the compatibilizer is a polyethylene bearing polyamide grafts and it results from the reaction (i) of a copolymer of ethylene and of a grafted or copolymerized unsaturated monomer X, with (ii) a polyamide. The copolymer of ethylene and of a grafted or copolymerized unsaturated monomer X is such that X is copolymerized and it can be chosen from ethylene-maleic anhydride copolymers and ethylene-alkyl (meth)acrylate-maleic anhydride copolymers, these copolymers comprising from 0.2 to 10% by weight of maleic anhydride and from 0 to 40% by weight of alkyl (meth)acrylate. According to another advantageous form, the compatibilizer is a polypropylene bearing polyamide grafts which results from the reaction (i) of a propylene homopolymer or copolymer comprising a grafted or copolymerized unsaturated monomer X, with (ii) a polyamide. Advantageously, X is grafted. The monomer X is advantageously an unsaturated carboxylic acid anhydride such as, for example, maleic anhydride.

As a second example of these mixtures based on EVOH of the second layer, mention may be made of compositions comprising:

50 to 98% by weight of an EVOH copolymer 1 to 50% by weight of a polyethylene 1 to 15% by weight of a compatibilizer consisting of a mixture of an LLDPE polyethylene or metallocene and of a polymer chosen from elastomers, very low density polyethylenes and metallocene polyethylenes, the mixture being co-grafted with an unsaturated carboxylic acid or a functional derivative of this acid.

Advantageously, the compatibilizer is such that the ratio $MFI_{10}/MFI_2$ is between 5 and 20, in which $MFI_2$ is the mass melt flow index at 190° C. under a load of 2.16 kg, measured according to ASTM D1238, and $MFI_{10}$ is the mass melt flow index at 190° C. under a load of 10 kg according to ASTM D1238.

As a third example of these mixtures based on EVOH of the second layer, mention may be made of compositions comprising:

50 to 98% by weight of an EVOH copolymer 1 to 50% by weight of an ethylene-alkyl (meth)acrylate copolymer, 1 to 15% by weight of a compatibilizer resulting from the reaction (i) of a copolymer of ethylene and of a grafted or copolymerized unsaturated monomer X with (ii) a copolyamide.

Advantageously, the copolymer of ethylene and of a grafted or copolymerized unsaturated monomer X is such that X is copolymerized and it is a copolymer of ethylene and of maleic anhydride or a copolymer of ethylene, of an alkyl (meth)acrylate and of maleic anhydride. Advantageously, these copolymers comprise from 0.2 to 10% by weight of maleic anhydride and from 0 to 40% by weight of alkyl (meth)acrylate.

As regards the polyamide (A) and the mixture of polyamide (A) and polyolefin (B) of the third layer, the term "polyamide" means the following products of condensation:

of one or more amino acids, such as aminocaproic acid, 7-aminoheptanoic acid, 11-aminoundecanoic acid and 12-aminododecanoic acid of one or more lactams such as caprolactam, oenantholactam and lauryllactam;

of one or more salts or mixtures of diamines such as hexamethylenediamine, dodecamethylenediamine, metaxylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, mention may be made of PA 6 and PA 6-6.

It is also advantageously possible to use copolyamides. Mention may be made of the copolyamides resulting from the condensation of at least two α,ω-aminocarboxylic acids or of two lactams or of one lactam and one α,ω-aminocarboxylic acid. Mention may also be made of the copolyamides resulting from the condensation of at least one α,ω-aminocarboxylic acid (or a lactam), at least one diamine and at least one dicarboxylic acid.

As examples of lactams, mention may be made of those containing from 3 to 12 carbon atoms on the main ring and which can be substituted. Mention may be made, for example, of β,β-dimethylpropiolactam, α,α-dimethylpropiolactam, amylolactam, caprolactam, capryllactam and lauryllactam.

As examples of α,ω-aminocarboxylic acids, mention may be made of aminoundecanoic acid and aminododecanoic acid. As examples of dicarboxylic acids, mention may be made of adipic acid, sebacic acid, isophthalic acid, butanedioic acid, 1,4-cyclo-hexanedicarboxylic acid, terephthalic acid, sodium or lithium salts of sulphoisophthalic acid, dimerized fatty acids (these dimerized fatty acids have a dimer content of at least 98% and are preferably hydrogenated) and dodecanedioic acid $HOOC-(CH_2)_{10}-COOH$.

The diamine can be an aliphatic diamine containing from 6 to 12 atoms, it can be arylic and/or saturated cyclic. As examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diaminepolyols, isophoronediamine (IPD), methylpentamethylenediamine (MPDM), bis(aminocyclohexyl)methane (BACM) and bis(3-methyl-4-aminocyclohexyl)methane (BMACM).

As examples of copolyamides, mention may be made of copolymers of caprolactam and of lauryllactam (PA 6/12), copolymers of caprolactam, of adipic acid and of hexamethylenediamine (PA 6/6-6), copolymers of caprolactam, of lauryllactam, of adipic acid and of hexamethylenediamine (PA 6/12/6-6), copolymers of caprolactam, of lauryllactam, of 11-aminoundecanoic acid, of azelaic acid and of hexamethylenediamine (PA 6/6-9/11/12), copolymers of caprolactam, of lauryllactam, of 11-aminoundecanoic acid, of adipic acid and of hexamethylenediamine (PA 6/6-6/11/12) and copolymers of lauryllactam, of azelaic acid and of hexamethylenediamine (PA 6-9/12).

Advantageously, the copolyamide is chosen from PA 6/12 and PA 6/6-6. The advantage of these copolyamides is that their melting point is less than that of PA 6.

It is also possible to use any amorphous polyamide which has no melting point.

The MFI of the polyamides and mixtures of polyamide and of polyolefin of the present invention is measured according to the rules of the art at a temperature of 15 to 20° C. above the melting point of the polyamide. As regards the mixtures based on PA 6, the MFI is measured at 235° C. under 2.16 kg. As regards the mixtures based on PA 6-6, the MFI is measured at 275° C. under 1 kg.

Polyamide mixtures can be used. Advantageously, the MFI of the polyamides is between 1 and 50 g/10 min.

It would not constitute a departure from the context of the invention to replace some of the polyamide (A) with a copolymer containing polyamide blocks and polyether blocks, i.e. to use a mixture comprising at least one of the above polyamides and at least one copolymer containing polyamide blocks and polyether blocks.

The copolymers containing polyamide blocks and polyether blocks result from the copolycondensation of polyamide sequences containing ends that are reactive with polyether sequences containing reactive ends, such as, inter alia:

1) polyamide sequences containing diamine chain ends with polyoxyalkylene sequences containing dicarboxylic chain ends.
2) polyamide sequences containing dicarboxylic chain ends with polyoxyalkylene sequences containing diamine chain ends, obtained by cyanoethylation and hydrogenation of α,ω-dihydroxylated aliphatic polyoxyalkylene sequences known as polyetherdiols.
3) polyamide sequences containing dicarboxylic chain ends with polyetherdiols, the products obtained being, in this specific case, polyetheresteramides. These copolymers are advantageously used.

The polyamide sequences containing dicarboxylic chain ends originate, for example, from the condensation of α,ω-aminocarboxylic acids, lactams or dicarboxylic acids and diamines in the presence of a chain-limiting dicarboxylic acid.

The polyether can be, for example, a polyethylene glycol (PEG), a polypropylene glycol (PPG) or a polytetramethylene glycol (PTMG). The latter is also known as polytetrahydrofuran (PTHF).

The number-average molar mass $M_n$ of the polyamide sequences is between 300 and 15,000 and preferably between 600 and 5000. The mass $M_n$ of the polyether sequences is between 100 and 6000 and preferably between 200 and 3000.

The polymers containing polyamide blocks and polyether blocks can also comprise randomly distributed units. These polymers can be prepared by the simultaneous reaction of the polyether and of polyamide block precursors.

For example, it is possible to react polyetherdiol, a lactam (or an α,ω-amino acid) and a chain-limiting diacid in the presence of a small amount of water. A polymer is obtained essentially containing polyether blocks, polyamide blocks of very variable length, but also various reagents which have reacted randomly and which are distributed randomly along the polymer chain.

Whether they originate from the copolycondensation of polyamide and polyether sequences prepared previously or from a one-step reaction, these polymers containing polyamide blocks and polyether blocks have, for example, Shore D hardnesses which can be between 20 and 75 and advantageously between 30 and 70, and an inherent viscosity of between 0.8 and 2.5, measured in meta-cresol at 250° C. for an initial concentration of 0.8 g/100 ml. The MFI values can be between 5 and 50 (235° C. under a load of 1 kg).

The polyetherdiol blocks are either used as they are and copolycondensed with polyamide blocks containing carboxylic ends, or they are aminated so as to be converted into polyetherdiamines and condensed with polyamide blocks containing carboxylic ends. They can also be mixed with polyamide precursors and a chain-limiter in order to make polymers containing polyamide blocks and polyether blocks having randomly distributed units.

Polymers containing polyamide and polyether blocks are described in U.S. Pat. Nos. 4,331,786, 4,115,475, 4,195,015, 4,839,441, 4,864,014, 4,230,838 and 4,332,920.

The ratio of the amount of copolymer containing polyamide blocks and polyether blocks to the amount of polyamide is, on a weight basis, advantageously between 10/90 and 60/40. Mention may be made, for example, of mixtures of (i) PA 6 and (ii) copolymer containing PA 6 blocks and PTMG blocks and mixtures of (i) PA 6 and (ii) copolymer containing PA 12 blocks and PTMG blocks.

As regards the polyolefin (B) of the mixture of polyamide (A) and polyolefin (B) of the third layer, it can be functionalized or non-functionalized or can be a mixture of at least one functionalized and/or of at least one non-functionalized. For simplicity, functionalized polyolefins (B1) and non-functionalized polyolefins (B2) have been described below.

A non-functionalized polyolefin (B2) is conventionally a homopolymer or copolymer of α-olefins or of diolefins such as, for example, ethylene, propylene, 1-butene, 1-octene or butadiene. By way of example, mention may be made of:

polyethylene homopolymers and copolymers, in particular LDPE, HDPE, LLDPE (linear low density polyethylene), VLDPE (very low density polyethylene) and metallocene poloyethylene.

propylene homopolymers or copolymers.

ethylene/α-olefin copolymers such as ethylene/propylene, EPR (abbreviation for ethylene-propylene-rubber) and ethylene/propylene/diene (EPDM).

styrene/ethylene-butene/styrene (SEBS), styrene/butadiene/styrene (SBS, styrene/isoprene/styrene (SIS) or styrene/ethylene-propylene/styrene (SEPS) block copolymers.

copolymers of ethylene with at least one product chosen from unsaturated carboxylic acid salts or esters, such as alkyl (meth)acrylate (for example methyl acrylate), or saturated carboxylic acid vinyl esters, such as vinyl acetate, it being possible for the proportion of comonomer to be up to 40% by weight.

The functionalized polyolefin (B1) can be an α-olefin polymer containing reactive units (functionalities); such reactive units are acid, anhydride or epoxy functions. By way of example, mention may be made of the above polyolefins (B2) grafted or co- or terpolymerized with unsaturated epoxides such as glycidyl (meth)acrylate, or with carboxylic acids or the corresponding salts or esters such as (meth)acrylic acid (it being possible for the latter to be totally or partially neutralized with metals such as Zn, etc.) or alternatively with anhydrides of carboxylic acids such as maleic anhydride. A functionalized polyolefin is, for example, a PE/EPR mixture, in which the weight ration can vary within a wide range, for example between 40/60 and 90/10, the said mixture being co-grafted with an anhydride, in particular maleic anhydride, according to a degree of grafting of, for example, from 0.001 to 5% by weight.

The functionalized polyolefin (B1) can be chosen from the following (co)polymers, grafted with maleic anhydride or glycidyl methacrylate, in which the degree of grafting is, for example, from 0.01 to 5% by weight:

PE, PP, copolymers of ethylene with propylene, butene, hexene or octene containing, for example, from 35 to 80% by weight of ethylene;

ethylene/α-olefin copolymers such as ethylene/propylene copolymers, EPR (abbreviation for ethylene-propylene-rubber) and ethylene/propylene/diene (EPDM) copolymers.

styrene/ethyhlene-butene/styrene (SEBS), styrene/butadiene/styrene (SBS), styrene/isoprene/styrene (SIS) or styrene/ethylene-propylene/styrene (SEPS) block copolymers.

ethylene-vinyl acetate (EVA) copolymers containing up to 40% by weight of vinyl acetate;

copolymers of ethylene and of alkyl (meth)acrylate, containing up to 40% by weight of alkyl (meth)acrylate;

ethylene-vinyl acetate (EVA) and alkyl (meth)acrylate copolymers, containing up to 40% by weight of comonomers.

The functionalized polyolefin (B1) can also be chosen from ethylene/propylene copolymers predominantly containing propylene grafted with maleic anhydride and then condensed with monoamino polyamide (or a polyamide oligomer) (products described in EP-A-0 342 066).

The functionalized polyolefin (B1) can also be a co- or terpolymer of at least the following units: (1) ethylene, (2) alkyl (meth)acrylate or saturated carboxylic acid vinyl ester and (3) anhydride such as maleic anhydride or (meth)acrylic acid of epoxy such as glycidyl (meth)acrylate. Examples of functionalized polyolefins of the latter type which may be mentioned are the following copolymers, in which ethylene preferably represents at least 60% by weight and in which the termonomer (the function) represents, for example, from 0.1 to 10% of the weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth)acrylic acid or maleic anhydride or glycidyl methacrylate copolymers.

In the preceding copolymers, the (meth)acrylic acid can be salified with Zn or Li.

The term "alkyl (meth)acrylate" in (B1) or (B2) denotes C1 to C8 alkyl methacrylates and acrylates and can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the abovementioned polyolefins (B1) can be also be crosslinked by any suitable process or agent (diepoxy, diacid, peroxide, etc.); the expression "functionalized polyolefin" also comprises mixtures of the abovementioned polyolefins with a difunctional reagent such as diacid, dianhydride, diepoxy, etc. which can react with the latter or mixtures of at least two functionalized polyolefins which can react together.

The copolymers mentioned above, (B1) and (B2), can be copolymerized in a random or block manner and can be a linear or branched structure.

The molecular weight, the MFI index and the density of these polyolefins can also vary within a wide range, which a person skilled in the art will appreciate. MFI, the abbreviation for melt flow index, is the flow rate in the molten state. It is measured according to ASTM standard 1238.

Advantageously, the non-functionalized polyolefins (B2) are chosen from polypropylene homopolymers or copolymers and any homopolymer of ethylene or copolymer of ethylene and of a comonomer of higher α-olefinic type such as butene, hexene, octene or 4-methyl-1-pentene. Mention may be made, for example, of PPs, high density PEs, medium density PEs, linear low density PEs, low density PEs and very low density PEs. These polyethylenes are known by those skilled in the art as being produced according to a "radical-mediated" process, according to a catalysis of "Ziegler" type or, more recently, according to a so-called "metallocene" catalysis.

Advantageously, the functionalized polyolefins (B1) are chosen from any polymer comprising α-olefinic units and units bearing reactive polar functions such as epoxy, carboxylic acid or carboxylic acid anhydride functions. As examples of such polymers, mention may be made of the terpolymers of ethylene, of alkyl acrylate and of maleic anhydride or of glycidyl methacrylate, such as the products Lotader® from the Applicant or polyolefins grafted with maleic anhydride, such as the products Orevac® from the Applicant, as well as terpolymers or ethylene, of alkyl acrylate and of (meth)acrylic acid. Mention may also be made of polypropylene homopolymers or copolymers grafted with a carboxylic acid anhydride and then condensed with polyamides or monoamino polyamide oligomers.

The MFI of (A) and the MFI of (B1) and (B2) can be chosen within a wide range, but it is recommended, in order to facilitate the dispersion of (B), that the MFI of (A) be greater than that of (B).

For small proportions of (B), for example 10 to 15 parts, it is sufficient to use a non-functionalized polyolefin (B2). The proportion of (B2) and (B1) in the phase (B) depends on the amount of functions present in (B1) as well as their reactivity. Advantageously, (B1)/(B2) weight ratios ranging from 5/35 to 15/25 are used. For small proportions of (B), it is also possible to use only one mixture of polyolefins (B1) to obtain crosslinking.

According to a first preferred form of the invention, the polyolefin (B) comprises (i) a high density polyethylene (HDPE) and (ii) a mixture of a polyethylene (C1) and a polymer (C2) chosen from elastomers, very low density polyethylenes and ethylene copolymers, the mixture (C1)+ (C2) being co-grafted with an unsaturated carboxylic acid.

According to a variant of the first form of the invention, the polyolefin (B) comprises (i) a high density polyethylene (HDPE), (ii) a polymer (C2) chosen from elastomers, very low density polyethylenes and ethylene copolymers (C2) being grafted with an unsaturated carboxylic acid and (iii) a polymer (C'2) chosen from elastomers, very low density polyethylenes and ethylene copolymers.

According to a second preferred form of the invention, the polyolefin (B) comprises (i) polypropylene and (ii) a polyolefin which results from the reaction of a polyamide (C4) with a copolymer (C3) comprising propylene and a grafted or copolymerized unsaturated monomer X.

According to a third preferred form of the invention, the polyolefin (B) comprises (i) a polyethylene of LLDPE, VLDPE or metallocene type and (ii) an ethylene-alkyl (meth)acrylate-maleic anhydride copolymer.

According to a fourth preferred form of the invention, the polyamide (A) is chosen from mixtures of (i) polyamide and (ii) copolymer containing PA 6blocks and PTMG blocks and mixtures of (i) polyamide and (ii) copolymer containing PA 12 blocks and PTMG blocks; the ration of the amounts of copolymer and of polyamide by weight being between 10/90 and 60/40. According to a first variant, the polyolefin (B) comprises (i) a polyethylene of LLDPE, VLDPE or metallocene type and (ii) an ethylene-alkyl (meth)acrylate-maleic anhydride copolymer; according to a second variant, the polyolefin comprises two functionalized polymers comprising at least 50 mol % of ethylene units and which can react to form a crosslinked phase.

As regards the first form, the proportions are advantageously as follows (by weight):

60 to 70% of polyamide, 5 to 15% of the co-grafted mixture of (C1) and (C2) the remainder being high density polyethylene.

As regard the high density polyethylene, its density is advantageously between 0.940 and 0.965 and the MFI between 0.1 and 5 g/10 min (190° C., 2.16 kg).

The polyethylene (C1) can be chosen from the polyethylenes mentioned above. Advantageously, (C1) is a high density polyethylene (HDPE) with a density of between 0.940 and 0.965. The MFI of (C1) is (under 2.16 kg-190° C.) between 0.1 and 3 g/10 min.

The copolymer (C2) can be, for example, an ethylene/propylene elastomer (EPR) or ethylene/propylene/diene elastomer (EPDM). (C2) can also be a very low density polyethylene (VLDPE) which is either an ethylene homopolymer or a copolymer of ethylene and of an α-olefin. (C2) can also be a copolymer of ethylene with at least one product chosen from (i) unsaturated carboxylic acids, salts thereof, esters thereof, (ii) vinyl esters of saturated carboxylic acids, (iii) unsaturated dicarboxylic acids, their salts, their esters, their hemiesters and their anhydrides. Advantageously, (C2) is an EPR.

Advantageously, 60 to 95 parts of (C1) are used per 40 to 5 parts of (C2).

The mixture of (C1) and (C2) is grafted with an unsaturated carboxylic acid, i.e. (C1) and (C2) are co-grafted. It would not constitute a departure from the context of the invention to use a functional derivative of this acid. Examples of unsaturated carboxylic acids are those containing from 2 to 20 carbon atoms, such as acrylic acid, methacrylic acid, maleic acid, fumaric acid or itaconic acid. The functional derivatives of these acids comprise, for example, the anhydrides, the ester derivative, the anhydrides, the ester derivatives, the amide derivatives, the imide derivatives and the metal salts (such as the alkali metal salts) of unsaturated carboxylic acids.

Unsaturated dicarboxylic acids containing 4 to 10 carbon atoms and functional derivatives thereof, particularly their anhydrides, are grafting monomers that are particularly preferred. These grafting monomers comprise, for example, maleic acid, fumaric acid, itaconic acid, citraconic acid, allylsuccinic acid, 4-cyclohexene-1,2-dicarboxylic acid, 4-methyl-4-cyclohexene-1,2-dicarboxylic acid, bicyclo(2,2,1)hept-5-ene-2,3-dicarboxylic acid, x-methylbicyclo(2,2,1)-hept-5-ene-2,3-dicarboxylic acid, maleic anhydride, itaconic anhydride, citraconic anhydride, allylsuccinic anhydride, 4-cyclohexene,1,2-dicarboxylic anhydride, 4-methylene-4-cyclohexene-1,2-dicarboxylic anhydride, bicyclo(2,2,1) hept-5-ene-2,3-dicarboxylic anhydride and x-methylbicyclo (2,2,2)hept-5-ene-2,2-dicarboxylic anhydride. Maleic anhydride is advantageously used.

Various know processes can be used to graft a grafting monomer onto the mixture of (C1) and (C2). For example, this can be carried out by heating the polymers (C1) and (C2) to high temperature, about 150° C. to about 300° C., in the presence or absence of a solvent with or without a radical-generator.

In the mixture of (C1) and (C2) modified by grafting, obtained in the abovementioned manner, the amount of the grafting monomer can be chosen is an appropriate manner, but is preferably from 0.01 to 10%, better still from 600 ppm to 2%, relative to the weight of grafted (C1) and (C2). The amount of the grafted monomer is determined by assaying the succinic functions by FTIR spectroscopy. The MFI of (C1) and (C2) which have been co-grafted is from 5 to 30 g/10 min (190° C.-2.16 kg), preferably 13 to 20.

Advantageously, the mixture of co-grafted (C1) and (C2) is such that the $MFI_{10}/MFI_2$ ratio is greater than 18.5, $MFI_{10}$ denoting the flow rate under a load of 2.16 kg. Advantageously, the $MFI_{20}$ of the mixture of co-grafted polymers (C1) and (C2) is less than 24. $MFI_{20}$ denotes the flow rate at 190° C. under a load of 21.6 kg.

As regards the variant of the first form, the proportions are advantageously as follows (by weight):

60 to 70% of polyamide, 5 to 10% of grafted (C2), 5 to 10% of (C'2), the remainder being high density polyethylene. Advantageously (C2) is and EPR or EPDM. Advantageously (C'2) is and EPR containing by weight 70 to 75% ethylene.

As regards the second form of the invention, the proportions are advantageously as follows (by weight):

60 to 70% of polyamide, 20 to 30% of polypropylene 3 to 10% of a polyolefin which results from the reaction of a polyamide (C4) with a copolymer (C3) comprising propylene and a grafted or copolymerized unsaturated monomer X.

The MFI of the polypropylene is advantageously less than 0.5 g/10 min (230° C.-2.16 kg) and preferably between 0.1 and 0.5. Such products are described in EP 647 681.

The grafted product of this second form of the invention is now described. To begin with, (C3) is prepared, which is either a copolymer of propylene and of an unsaturated monomer X or a polypropylene onto which is grafted an unsaturated monomer X. X is any unsaturated monomer which can be copolymerized with the propylene or grafted onto the polypropylene and which has a function that can react with a polyamide. This function can be, for example, a carboxylic acid, a dicarboxylic acid anhydride or an epoxide. As examples of monomers X, mention may be made of (meth)acrylic acid, maleic anhydride and unsaturated epoxides such as glycidyl (meth)acrylate. Maleic anhydride is advantageously used. As regards the grafted polypropylenes, X can be grafted onto polypropylene homo- or copolymers, such as ethylene-propylene copolymers predominantly containing propylene (in moles). Advantageously, (C3) is such that X is grafted. The grafting is an operation which is know per se.

(C4) is a polyamide or a polyamide oligomer. Polyamide oligomers are described in EP 342 066 and FR 2 291 225. The polyamides (or oligomers) (C4) are the products of condensation of the monomers already mentioned above. Mixtures of polyamides can be used. PA-6, PA-11 PA 12, the copolyamide containing units 6 and units 12 (PA-6/12) and the copolyamide based on caprolactam, hexamethylenediamine and adipic acid (PA-6/6.6) are advantageously used. The polyamides or oligomers (C4) can contain acid, amine or monoamine ending. In order for the polyamide to contain a monomine ending, it suffices to use a chain-limiter of formula

in which:

$R_1$ is hydrogen or a linear or branches alkyl group containing up to 20 carbon atoms, $R_2$ is a group containing up to 20 linear or branched alkyl or alkenyl carbon atoms, a saturated or unsaturated cycloaliphatic radical, an aromatic radical or a combination of the above. The limiter can be, for example, laurylamine or oleylamine.

Advantageously, (C4) is a PA-6, PA-11 or a PA-12. The proportion of C4 in C3+C4 by weight is advantageously between 0.1 and 60%. The reaction of (C3) with (C4) is preferably carried out in the molten state. For example, (C3) and (C4) can be blended in an extruder at a temperature generally of between 230 and 250° C. The average residence time of the molten material in the extruder can be between 10 seconds and 3 minutes and preferably between 1 and 2 minutes.

As regards the third form, the proportions are advantageously as follows (by weight):

60 to 70% of polyamide, 5 to 15% of an ethylene-alkyl (meth)acrylate-maleic anhydride copolymer.

the remainder is a polyethylene of LLDPE, VLDPE or metallocene type; advantageously, the density of this polyethylene is between 0.870 and 0.925, and the MFI is between 0.1 and 5 (190° C.-2.16 kg).

Advantageously, the ethylene-alkyl (meth)acrylate-maleic anhydride copolymers comprise from 0.2 to 10% by weight of maleic anhydride, up to 40% and preferably 5 to 40% by weight of alkyl (meth)acrylate. Their MFI is between 2 and 100(190° C.-2.16 kg). The alkyl (meth) acrylates have already been described above. The melting point is between 80 and 120 20 C. These copolymers are commercially available. They are produced by radical-mediated polymerization at a temperature which can be between 200 and 2500 bar.

As regards the fourth form, the proportions are advantageously as follows (by weight):

According to a First Variant:

60 to 70% of the mixture of polyamide and of copolymer containing polyamide blocks and polyether blocks, 5 to 15% of an ethylene-alkyl (meth)acrylate-maleic anhydride copolymer, the remainder is a polyethylene of LLDPE, VLDPE or metallocene type; advantageously, its density is between 0.870 and 0.925, and the MFI is between 0.1 and 5 (190° C.-2.16 kg).

Advantageously, the ethylene-alkyl (meth)acrylate-maleic anhydride copolymers comprise from 0.2 to 10% by weight of maleic anhydride, up to 40% and preferably 5 to 40% by weight of alkyl (meth)acrylate. Their MFI is between 2 and 100 (190° C.-2.16 kg). The alkyl (meth) acrylates have already been described above. The melting point is between 80 and 120° C. These copolymers are commercially available. They are produced by radical-mediated polymerization at a pressure which can be between 200 and 2500 bar.

According to a Second Variant:

40 to 95% of the mixture of polyamide and of copolymer containing polyamide blocks and polyether blocks, 60 to 5% of a mixture of an ethylene-alkyl (meth)acrylate-maleic anhydride copolymer and of an ethylene-alkyl (meth)acrylate-glycidyl methacrylate copolymer.

The copolymer with the anhydride was defined in the first variant. The ethylene/alkyl (meth)acrylate/glycidyl methacrylate copolymer can contain up to 40% by weight of alkyl (meth)acrylate, advantageously from 5 to 40%, and up to 10% by weight of unsaturated epoxide, preferably 0.1 to 8%. Advantageously, the alkyl (meth)acrylate is chosen from methyl (meth)acrylate, ethyl acrylate, n-butyl acrylate, isobutyl acrylate and 2-ethylhexyl acrylate. The amount of alkyl (meth)acrylate is preferably from 20 to 35%. The MFI is advantageously between 5 and 100 (in g/10 min at 190° C. under 2.16 kg) and the melting point is between 60 and 110° C. This copolymer can be obtained by radical-mediated polymerization of the monomers.

Catalysts can be added to accelerate the reaction between the epoxy and anhydride functions. Among the compounds capable of accelerating the reaction between the epoxy and anhydride functions. Among the compounds capable of accelerating the reaction between the epoxy function and the anhydride function, mention may be made in particular of:

tertiary amines such as dimethyllaurylamine, dimethylstearylamine, N-butylmorpholine, N,N-dimethylcyclohexylamine, benzyldimethylamine, pyridine, 4-dimethylaminopyridine, 1-methylimidazole, tetramethylethylhydrazine, N,N-dimethylpiperazine, N,N,N',N'-tetramethyl-1,6-hexanediamine, a mixture of tertiary amines containing from 16 to 18 carbon atoms, known under the name dimethyltallowamine, tertiary phosphines such as triphenyl-phosphine zinc alkyldithiocarbamates acids.

The preparation of the mixtures of the third layer can be carried out by mixing together the various constituents in the molten state in the apparatus usually used in the thermoplastic polymer industry.

The first layer can consist of a layer of virgin HDPE and a layer of recycled polymers obtained from scaps from the manufacture of the transfer or storage devices or of these non-compliant devices as explained in the prior art already mentioned. This recycled layer is located on the binder layer side. In the text hereinbelow these two layers will be denoted for simplicity by the term "first layer".

The thickness of the first layer can be between 2 and 10 mm, that of the second layer between 30 and 500 µm and that of the third layer between 30 µm and 2 mm. As regards the tanks, the total thickness is usually between 3 and 10 mm.

A layer of binder can also be placed between the second and the third layer. By way of examples of binders, mention may be made of the functionalized polyolefins (B1) described above. The binder between the first and second layer and that between the second and third layer may be identical or different. In the descriptions below of binders, the term "polyethylene" denotes both homopolymers and copolymers; such products have been described earlier in the polyolefins of the third layer.

As a first example of a binder, mention may be made of the mixture of co-grafted (C1) and (C2) described above in the first preferred form of the third layer.

As a second example of a binder, mention may be made of mixtures comprising:

5 to 30 parts of a polymer (D) which itself comprises a mixture of a polyethylene (D1) with a density of between 0.910 and 0.940 and of a polymer (D2) chosen from elastomers, very low density polyethylenes and metallocene polyethylenes, the mixture (D1)+(D2) being co-grafted with an unsaturated carboxylic acid, 95 to 70 parts of a polyethylene (E) with a density of between 0.910 and 0.930, the mixture of (D) and (E) being such that:

its density is between 0.910 and 0.930, the content of grafted unsaturated carboxylic acid is between 30 and 10,000 ppm, the MFI (ASTM D 1238-190° C.-2.16 kg) is between 0.1 and 3 g/10 min. The MFI denotes the melt flow index.

The density of the binder is advantageously between 0.915 and 0.920. Advantageously, (D1) and (E) are LLDPEs, and preferably have the same comonomer. This comonomer can be chosen from 1-hexene, 1-octene and 1-butene.

As a third example of a binder, mention may be made of mixtures comprising:

5 to 30 parts of a polymer (F) which itself comprises a mixture of a polyethylene (F1) with a density of between 0.935 and 0.980 and of a polymer (F2) chosen from elastomers, very low density polyethylenes and ethylene copolymers, the mixture (F1)+(F2) being co-grafted with an unsaturated carboxylic acid, 95 to 70 parts of a polyethylene (G) with a density of between 0.930 and 0.950, the mixture of (F) and (G) being such that:

its density is between 0.930 and 0.950 and advantageously between 0.930 and 0.940, the content of grafted unsaturated carboxylic acid is between 30 and 10,000 ppm, the MFI (melt flow index) measured according to ASTM D 1238 at 190° C.-21.6 kg is between 5 and 100.

As a fourth example of a binder, mention may be made of polyethylene grafted with maleic anhydride, having an MFI of 0.1 to 3, a density of between 0.920 and 0.930 and containing 2 to 40% by weight of insolubles in n-decane at 90° C. To determine the insolubles in n-decane, the grafted polyethylene is dissolved in n-decane at 140° C., the solution is cooled to 90° C. and products precipitate; the mixture is then filtered and the insolubles content is the percentage by weight which precipitates, and is collected by filtration at 90° C. If the content is between 2 and 40%, the binder has good resistance to petrol.

Advantageously, the grafted polyethylene is diluted in a non-grafted polyethylene and such that the binder is a mixture of 2 and 30 parts of a grafted polyethylene with a density of between 0.930 and 0.980 and from 70 to 98 parts of a non-grafted polyethylene with a density of between 0.910 and 0.940, preferably between 0.915 and 0.935.

As a fifth example of a binder, mention may be made of mixtures comprising:

50 to 100 parts of a polyethylene homo- or copolymer (J) with a density of greater than or equal to 0.9, 0 to 50 parts of a polymer (K) chosen from polypropylene homo- or copolymer (K1), poly(1-butene) homo- or copolymer (K2) and polystyrene homo- or copolymer (K3), the amount of (J)+(K) being 100 parts, the mixture of (J) and (K) being grafted with at least 0.5% by weight of a functional monomer, this grafted mixture itself being diluted in at least one polyethylene homo- or copolymer (L) or in at least one polymer of elastomeric nature (M) or in a mixture of (L) and (M).

According to one form of the invention, (J) is and LLDPE with a density of 0.91 to 0.930, the comonomer containing from 4 to 8 carbon atoms. According to another form of the invention, (K) is an HDPE advantageously with a density of at least 0.945 and preferably from 0.950 to 0.980.

Advantageously, the functional monomer is maleic anhydride and its content is from 1 and 5% by weight of (J)+(K).

Advantageously, (L) is an LLDPE in which the comonomer contains from 4 to 8 carbon atoms and, preferably, its density is at least 0.9 and preferably 0.910 to 0.930.

Advantageously, the amount of (L) or (M) or (L)+(M) is from 97 to 75 parts per 3 to 25 parts of (J)+(K), the amount of (J)+(K)+(L)+(M) being 100 parts.

As a sixth example of a binder, mention may be made of mixture consisting of a polyethylene of HDPE, LLDPE, VLDPE or LDPE type, 5 to 35% of a grafted metallocene polyethylene and 0 to 35% of an elastomer, the total being 100%.

As a seventh example of a binder, mention may be made of mixtures comprising:

at least one polyethylene or an ethylene copolymer, at least one polymer chosen from polypropylene or a propylene copolymer, poly(1butene) homo- or copolymer, polystyrene homo- or copolymer and preferably polypropylene, this mixture being grafted with a functional monomer, this grafted mixture itself optionally being diluted in at least one polyolefin or in at least one polymer of elastomeric nature or in a mixture thereof. In the above mixture which is grafted, the polyethylene advantageously represents at least 50% of this mixture and preferably 60 to 90% by weight.

Advantageously, the functional monomer is chosen from carboxylic acids and derivatives thereof, acid chlorides, isocyanates, oxazolines, epoxides, amines or hydroxides and preferably unsaturated dicarboxylic acid anhydrides.

As an eighth example of a binder, mention may be made of mixtures comprising:

at least one LLDPE or VLDPE polyethylene at least one elastomer based on ethylene chosen from ethylene-propylene copolymers and ethylene-butene copolymers this mixture of polyethylene and of elastomer being grafted with an unsaturated carboxylic acid or a functional derivative of this acid this co-grafted mixture optionally being diluted in a polymer chosen from polyethylene homo- or copolymers and styrene block copolymers the binder having (a) an ethylene content which is not less than 70 mol %

(b) a content of caboxylic acid or of its derivative of from 0.01 to 10% by weight of the binder and (c) and $MFI_{10}MFI_2$ ration of from 5 to 20, in which $MFI_2$ is the mass melt flow index at 190° C. under a load of 10 kg, according to ASTM D 1238.

The various layers in the structure of the invention, including the layers of binder, can also contain at least one additive chosen from:

fillers (mineral fillers, flame-retardant fillers, etc);

fibres;

dyes;

pigments;

optical brighteners;

antioxidants;

UV stabilizers.

EXAMPLES

The following products were used:

EVOH D: ethylene-vinyl alcohol copolymer containing 29 mol % of ethylene, MFI 8 (210° C.-2.16 kg), melting point 188° C., crystallization temperature 163° C. Tg (glass transition temperature) 62° C.

Mixtures were prepared of polyamide and of polyolefin for the third layer, known as Orgalloy®, and were made from the following products:

Polyamides (A)

PA 1: Copolyamide 6/6-6 of medium viscosity with a melting point of 196° C. and a flow index of 4.4 g/10 min according to ASTM 1238 at 235° C. under a weight of 1 kg.

PA 2: Copolyamide 6/6-6 of medium viscosity with a melting point of 196° C. and a flow index of 6.6 g/10 min according to ASTM 1238 at 235° C. under a weight of 1 kg.

Polyolefins (B2)

LLDPE: Linear low density polyethylene with a density of 0.920 kg/l according to ISO 1872/1 and a flow index of 1 g/10 min according to ASTM 1238 at 190° C. under a weight of 2.16 kg.

HDPE: High density polyethylene with a density of 0.952 kg/l according to ISO 1872/1 and a flow index of 0.4 g/10 min according to ASTM 1238 at 190° C. under a weight of 2.16 kg.

Polyolefins (B1)

B1-1: This is a carrier PE with a content of 3000 ppm of maleic anhydride and having a flow index of 1 g/10 min according to ASTM 1238 at 190° C. under a weight of 2.16 kg.

flow rate of the extruder is 50 kg/h and the spin speed of the screws is 150 rpm and the material temperatures at sleeves ¾, ⁵⁄₇, and ⅞ and at the die outlet are, respectively, 245, 263, 265 and 276° C. The extruded rods are granulated and then oven-dried under vacuum for 8 hours at 80° C. The compositions are given in Table 1 below (proportions by weight):

TABLE 1

| Product | Orgalloy C1 | Orgalloy C2 | Orgalloy C3 | Orgalloy C4 |
|---|---|---|---|---|
| PA1 | 64.3 | 64.3 | | |
| PA2 | | | 64.3 | 64.3 |
| LLDPE | 27 | | 27 | |
| HDPE | | 27 | | 27 |
| Bl-1 | 8 | 8 | 8 | 8 |
| Anti 1 | 0.5 | 0.5 | 0.5 | 0.5 |
| Anti 2 | 0.2 | 0.2 | 0.2 | 0.2 |

Orgalloy® 1: mixture of polyamide 6 and of polyolefin corresponding to the third preferred form of the third layer and consisting (by weight) of:

65 parts of PA 6

25 parts of linear low density polyethylene of MFI 0.9 g/10 min and density 0.920, 10 parts of a copolymer of ethylene, of butyl acrylate and of maleic anhydride in proportions by weight of 91/6/3 and of MFI 5 (190° C.-2.16 kg)

The binders described in the § "Second example of a binder" are referred to as binder 2a-binder 2d, and their details are given in Table 2 below.

TABLE 2

| | | Formulations of the binders | | | |
|---|---|---|---|---|---|
| | | Binder 2a | Binder 2b | Binder 2c | Binder 2d |
| Polyethylene D1 | Comonomer | 1-octene | 1-butene | 1-hexene | 1-octene |
| | Density (g/cm³) | 0.919 | 0.917 | 0.918 | 0.919 |
| | MFI (g/10 min; 2.16 kg) | 4.4 | 2.5 | 3 | 4.4 |
| | % by weight D1/D1 + D2 | 75 | 90 | 80 | 75 |
| Polyethylene D2 | Comonomer | propylene | 1-butene | 1-octene | 1-octene |
| | Density (g/cm³) | 0.880 | 0.900 | 0.870 | 0.870 |
| | MFI (g/10 min; 2.16 kg) | 0.2 | 2.8 | 5 | 5 |
| | % by weight D2/D1 + D2 | 25 | 10 | 20 | 25 |
| Co-grafted mixture D | Maleic anhydride content (ppm) | 3800 | 7500 | 4000 | 8000 |
| | % by weight D/D + E | 20 | 10 | 15 | 15 |
| Polyethylene E | Comonomer | 1-octene | 1-butene | 1-hexene | 1-octene |
| | Density (g/cm³) | 0.919 | 0.919 | 0.921 | 0.920 |
| | MFI (g/10 min; 2.16 kg) | 1.1 | 1 | 0.5 | 1 |
| Mixture D + E | Density (g/cm³) | 0.917 | 0.919 | 0.919 | 0.918 |
| | MFI (g/10 min; 2.16 kg) | 1.0 | 0.8 | 0.5 | 1.1 |
| | Maleic anhydride content (ppm) | 760 | 750 | 600 | 1200 |

Antioxidants

Anti 1: Antioxidant of hindered phenolic type.

Anti 2: Secondary antioxidant of phosphite type.

The copolyamide, the polyolefin and the functional polyolefin are introduced, via three independent weight-metering devices (or by simple dry-premixing of the various granulates), into the hopper of a Werner-Pfleiderer co-rotating twin-screw extruder with a diameter of 40 mm, L/D=40 (9 sleeves+4 struts, i.e. a total length of 10 sleeves). The total Bottles of 1 liter were manufactured consisting of the following layers:

HDPE

Binder

EVOH D

Orgalloy

Any combination of Binders 2a to 2d and any combination of Orgalloy C1-C4 and Orgalloy 1 were used.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A structure comprising, successively:
    a first layer of high density polyethylene (HDPE)
    a layer of binder,
    a second layer of an ethylene-vinyl alcohol copolymer or of a mixture based on an ethylene-vinyl alcohol copolymer, and
    a third layer of a mixture of a polyamide (A) and a polyolefin (B), wherein polyolefin (B) comprises:
    (i) a high density polyethylene, and either
    (ii) a mixture of a polyethylene (C1) and a polymer (C2) selected from the group consisting of elastomers, very low density polyethylenes and ethylene copolymers, the mixture (C1)+(C2) being co-grafted with an unsaturated carboxylic acid, or,
    a mixture of:
    (ii) a polymer (C2) selected from the group consisting of elastomers, very low density polyethylenes and ethylene copolymers, the polymer (C2) being grafted with an unsaturated carboxylic acid, and
    (iii) a polymer (C'2) selected from the group consisting of elastomers, very low density polyethylenes and ethylene copolymers.

2. A structure according to claim 1, further comprising a layer of binder between the second and the third layer.

3. A structure according to claim 1, in which the binder comprises:
    5 to 30 parts by weight per hundred of a polymer (D) which itself comprises a mixture of a polyethylene (D1) with a density of from 0.910 to 0.940 g/cm$^3$ and of a polymer (D2) selected from the group consisting of elastomers, very low density polyethylenes and metallocene polyethylenes, the mixture (D1)+(D2) being co-grafted with an unsaturated carboxylic acid,
    95 to 70 parts by weight per hundred of a polyethylene (E) with a density of from 0.910 to 0.930 g/cm$^3$,
    the mixture of (D) and (E) being such that:
        its density is from 0.910 to 0.930 g/cm$^3$,
        the content of grafted unsaturated carboxylic acid is between 30 and 10,000 ppm, and
        the melt flow index, measured by ASTM D 1238, at 190° C. and 2.16 kg, is between 0.1 and 3 g/10 mm.

4. A structure according to claim 3, in which the density of the binder is from 0.915 to 0.920 g/cm$^3$.

5. A structure according to claim 3, in which (D1) and (E) are LLDPEs which have the same comonomer.

6. A structure according to claim 1, in which the binder comprises:
    5 to 30 parts by weight per hundred of a polymer (F) which itself comprises a mixture of a polyethylene (F1) with a density of from 0.935 to 0.980 g/cm$^3$ and of a polymer (F2) selected from the group consisting of elastomers, very low density polyethylenes and ethylene copolymers, the mixture (F1)+(F2) being co-grafted with an unsaturated carboxylic acid,
    95 to 70 parts by weight per hundred of a polyethylene (G) with a density of from 0.930 to 0.950 g/cm$^3$,
    the mixture of (F) and (G) being such that:
        its density is from 0.930 to 0.950 g/cm$^3$,
        the content of grafted unsaturated carboxylic acid is between 30 and 10,000 ppm,
        the metal flow index, measured by ASTM D 1238 at 190° C. and 21.6 kg, is between 5 and 100 g/10 mm.

7. A structure according to claim 1, in which the binder is a polyethylene grafted with maleic anhydride, having a melt flow index, measured by ASTM D 1238 at 190° C. and 21.6 kg, of 0.1 to 3 g/10 mm, and a density of from 0.920 to 0.930 g/cm$^3$.

8. A structure according to claim 7, in which the grafted polyethylene is diluted in a non-grafted polyethylene such that the binder is a mixture of 2 to 30 parts by weight per hundred of a grafted polyethylene with a density of from 0.930 to 0.980 g/cm$^3$ and from 70 to 98 parts by weight per hundred of a non-grafted polyethylene with a density of from 0.910 to 0.940 g/cm$^3$.

9. A structure according to claim 1, in which the binder is a mixture consisting of a HDPE, LLDPE, VLDPE or LDPE polyethylene, 5 to 35% by weight of a grafted metallocene polyethylene and 0 to 35% by weight of an elastomer, based on a total of 100% by weight.

10. A structure according to claim 1, in which the polyamide of the third layer is a copolyamide.

11. A structure according to claim 1, wherein the third layer comprises a polyolefin (B) which comprises:
    (i) a high density polyethylene and
    (ii) a mixture of a polyethylene (C1) and a polymer (C2) selected from the group consisting of elastomers, very low density polyethylenes and ethylene copolymers, the mixture (C1)+(C2) being co-grafted with an unsaturated carboxylic acid.

12. A structure according to claim 1, wherein the third layer comprises a polyolefin (B) which comprises:
    (i) a high density polyethylene,
    (ii) a polymer (C2) selected from the group consisting of elastomers, very low density polyethylenes and ethylene copolymers, the polymer (C2) being grafted with an unsaturated carboxylic acid and
    (iii) a polymer (C'2) selected from the group consisting of elastomers, very low density polyethylenes and ethylene copolymers.

13. A structure according to claim 1, in which the polyamide (A) of the third layer is selected from the group consisting of:
    mixtures of (i) a polyamide and (ii) a copolymer containing polyamide-6 blocks and polytetramethylene glycol blocks, and
    mixtures of (i) a polyamide and (ii) a copolymer containing polyamide-12 blocks and polytetramethylene glycol blocks,
    the weight ratio of the amounts of copolymers (ii) and polyamides (i) being from 10:90 to 60:40.

14. A structure according to claim 13, in which the third layer comprises a polyolefin B, which comprises (i) a LLDPE, VLDPE or metallocene polyethylene and (ii) an ethylene-alkyl (meth)acrylate-maleic anhydride copolymer.

15. A structure according to claim 13, in which the third layer comprises a polyolefin (B) which comprises two functionalized polymers comprising at least 50 mol % of ethylene units and is crosslinkable.

16. A structure according to claim 2, in which the binder comprises:
- 5 to 30 parts by weight per hundred of a polymer (D) which itself comprises a mixture of a polyethylene (D1) with a density of from 0.910 to 0.940 g/cm$^3$ and of a polymer (D2) selected from the group consisting of elastomers, very low density polyethylenes and metallocene polyethylenes, the mixture (D1)+(D2) being co-grafted with an unsaturated carboxylic acid,
- 95 to 70 parts by weight per hundred of a polyethylene (E) with a density of from 0.910 to 0.930 g/cm$^3$,
- the mixture of (D) and (E) being such that:
  - its density is from 0.910 to 0.930 g/cm$^3$,
  - the content of grafted unsaturated carboxylic acid is between 30 and 10,000 ppm, and
  - the melt flow index, measured by ASTM D 1238 at 190° C. and 2.16 kg, is between 0.1 and 3 g/10 mm.

17. A structure according to claim 2, in which the binder comprises:
- 5 to 30 parts by weight per hundred of a polymer (F) which itself comprises a mixture of a polyethylene (F1) with a density of from 0.935 to 0.980 g/cm$^3$ and of a polymer (F2) selected from the group consisting of elastomers, very low density polyethylenes and ethylene copolymers, the mixture (F1)+(F2) being co-grafted with an unsaturated carboxylic acid,
- 95 to 70 parts by weight per hundred of a polyethylene (G) with a density of from 0.930 to 0.950 g/cm$^3$, the mixture of (F) and (G) being such that:
  - its density is from 0.930 to 0.950 g/cm$^3$,
  - the content of grafted unsaturated carboxylic acid is between 30 and 10,000 ppm,
  - the melt flow index, measured by ASTM D 1238 at 190° C. and 21.6 kg, is between 5 and 100 g/10 mm.

18. A device for transferring and/or storing fluids comprising a structure according to claim 1 such that the fluids so stored and/or transferred are in contact with the third layer side of the structure.

19. A device according to claim 18, wherein the device is a tube, a tank, a chute, or a bottle.

20. A device according to claim 18, wherein the device is a container.

21. A structure according to claim 11, in which the third layer comprises:
- 60 to 70% by weight of polyamide (A)
- 5 to 15% by weight of the co-grafted mixture of polyethylene (C1) and polymer (C2), and
- the remainder of high density polyethylene.

22. A structure according to claim 12, in which the third layer comprises:
- 60 to 70% by weight of polyamide (A)
- 5 to 10% by weight of the grafted polymer (C2),
- 5 to 10% by weight of polymer (C'2), and
- the remainder of high density polyethylene.

23. A structure according to claim 1, wherein the polyamide (A) in the third layer is a PA 6/6-6 copolymer of caprolactam, adipic acid and hexamethylenediamine.

24. A structure according to claim 1, wherein the first layer has a thickness between 2 and 10 mm, the second layer between 30 and 500 μm and the third layer between 30 μm and 2 mm.

25. A device according to claim 18, wherein the fluid is selected from the group consisting of petrol, oil, motor vehicle cooling fluid and air conditioning fluid.

26. A device according to claim 18, wherein the fluid is petrol.

* * * * *

UNITED STATES PATENT AND TRADEMARK OFFICE
CERTIFICATE OF CORRECTION

PATENT NO. : 7,169,453 B2
APPLICATION NO. : 09/777012
DATED : January 30, 2007
INVENTOR(S) : Christophe Le Roy et al.

Page 1 of 1

It is certified that error appears in the above-identified patent and that said Letters Patent is hereby corrected as shown below:

Column 17, line 54, reads "3 g/10 mm." should read -- 3 g/10 mm, --
Column 18, line 8, reads "100 g/10 mm." should read -- 100 g/10 min. --
Column 18, line 12, reads "3 g/10 mm." should read --3 g/10 min. --
Column 19, line 17, reads "3 g/10 mm." should read --3 g/10 min. --
Column 19, line 29, reads "mixture of(F)" should read -- mixture of (F) --
Column 19, line 34, reads "100 g/10 mm." should read -- 100 g/10 min. --

Signed and Sealed this

Twentieth Day of November, 2007

JON W. DUDAS
*Director of the United States Patent and Trademark Office*